Dec. 19, 1967  H. J. WEBB ETAL  3,359,535
UNDERWATER COMMUNICATOR
Filed Jan. 6, 1966  5 Sheets-Sheet 1

INVENTORS
HERBERT J. WEBB
BY JOSEPHINE R. WEBB

ATTYS.

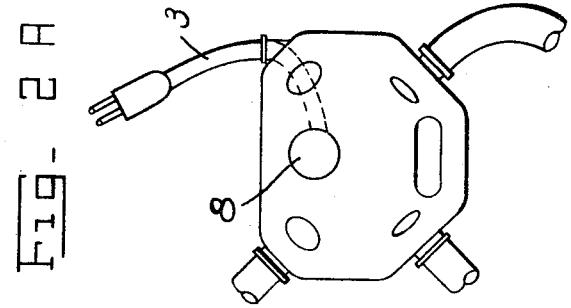
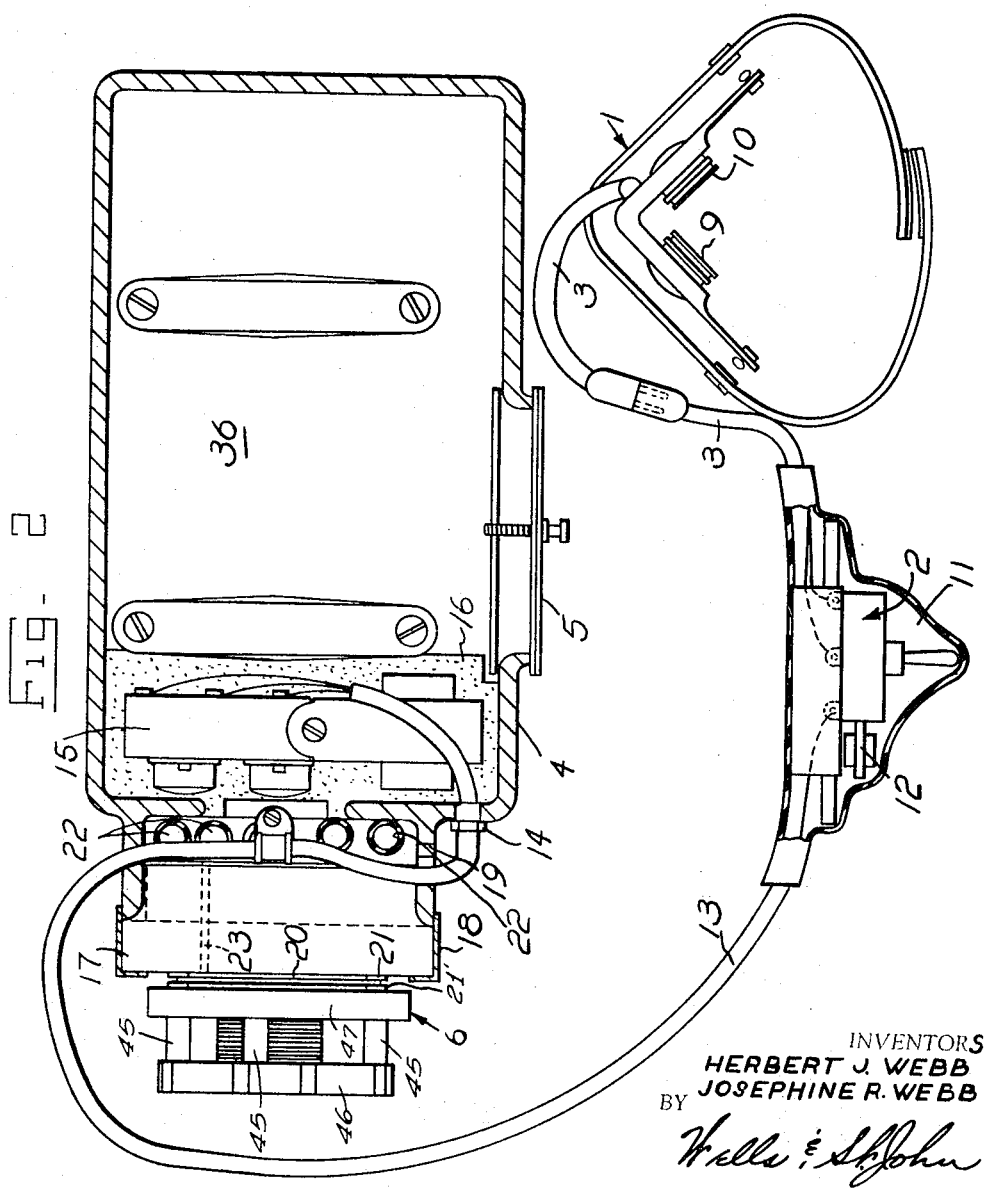

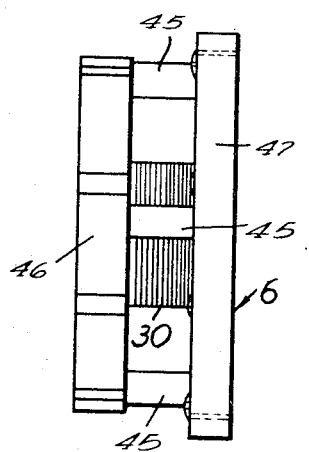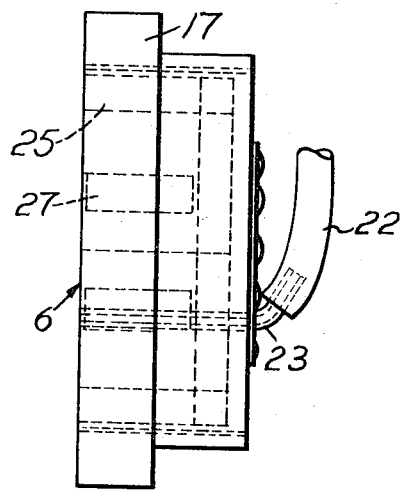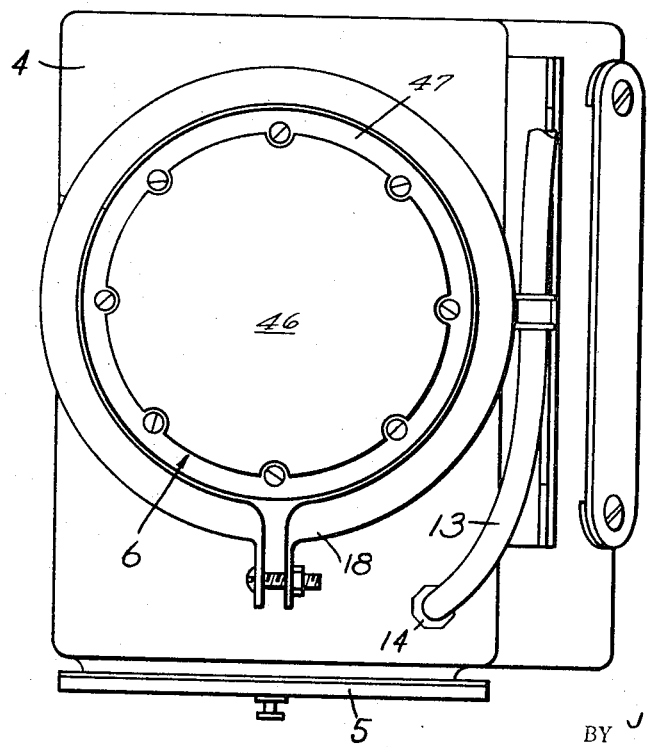

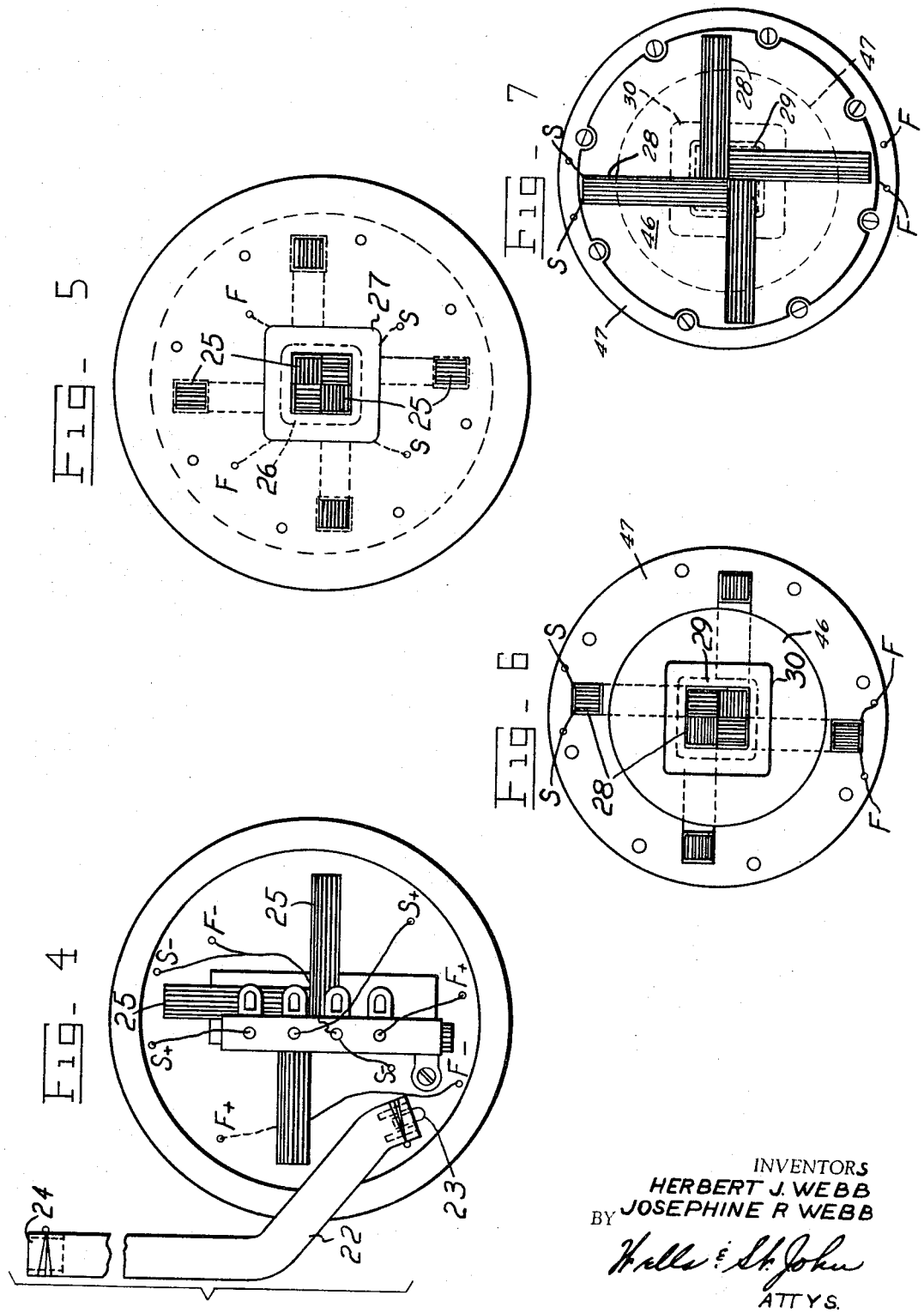

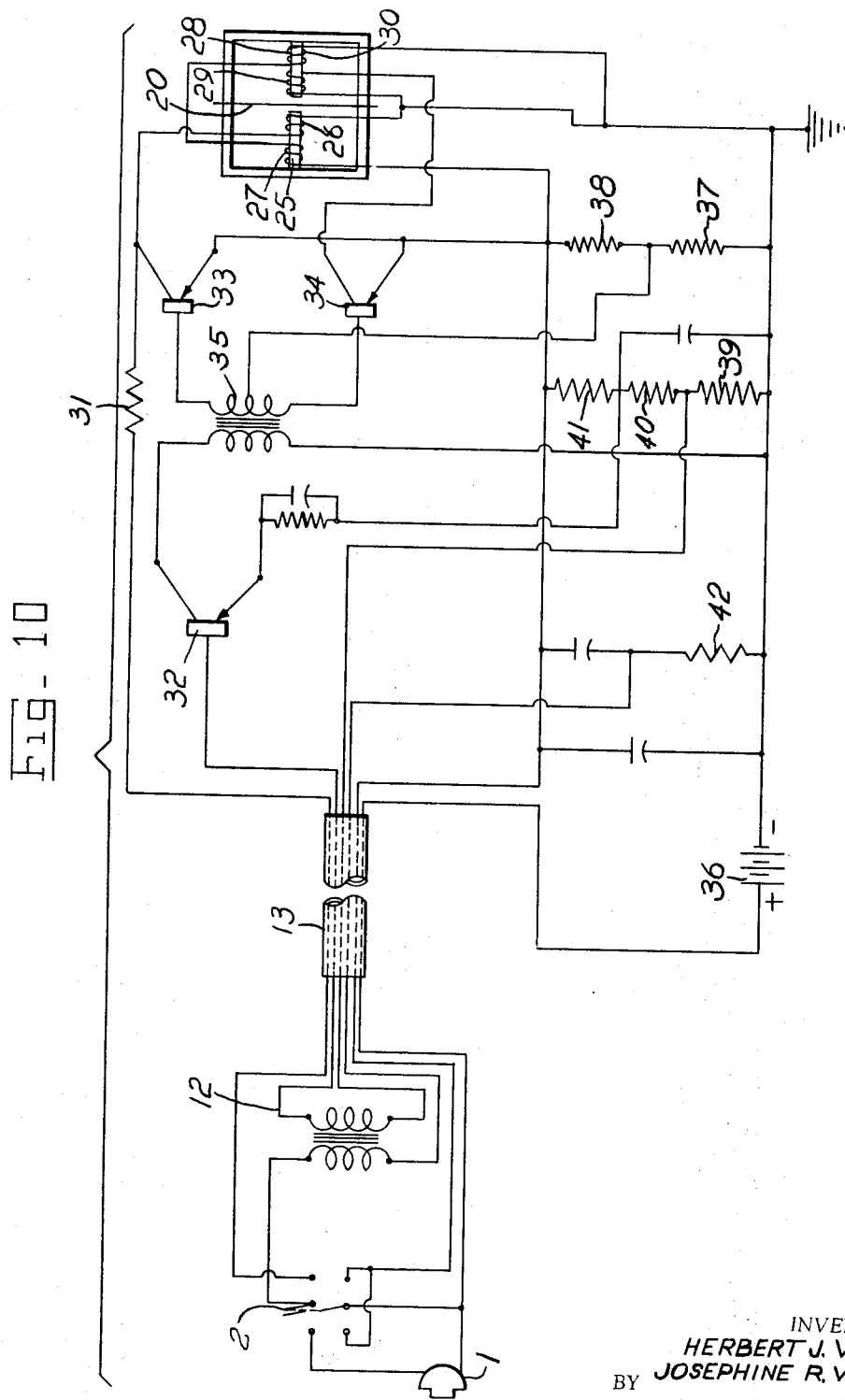

United States Patent Office 3,359,535
Patented Dec. 19, 1967

3,359,535
UNDERWATER COMMUNICATOR
Herbert J. Webb and Josephine R. Webb, both of
Rockford Bay, Idaho 83859
Filed Jan. 6, 1966, Ser. No. 519,085
10 Claims. (Cl. 340—5)

ABSTRACT OF THE DISCLOSURE

An underwater communication device including an improved transducer utilizing dual magnetic structures at each side of a diaphragm constructed of magnetic material. The magnetic structures each include a signal coil and a field coil at opposite sides of the diaphragm which facilitate transmission of signals through water medium. Each magnetic structure utilizes a high permeability core material. Matching acoustic material is disclosed for utilization on the hood of a diver receiving messages from the device.

---

This invention relates to underwater communication devices and particularly to apparatus which allows a diver to communicate with other divers even though the listening divers have no receiving devices other than their natural ears.

It is the principal purpose of this invention to provide a device whereby an underwater diver may communicate his voice to other divers underwater in such fashion that they may hear him without any artificial aids to their natural ears and without the use of interconnecting wires.

It is a further purpose of this invention to provide a device whereby an underwater diver may communicate his voice to persons in a boat on the surface of the water without the use of interconnecting wires.

It is a further purpose of this invention to provide a device whereby a diver underwater may communicate to other divers underwater or to a boat on the surface by means of a continuous tone signal which the transmitting diver may switch on and off in accordance with a previously arranged code, without the other divers underwater using any artificial aids to their natural ears and without the use of any interconnecting wires.

It is a further purpose of this invention to provide means whereby listening divers may hear audio frequency sounds underwater even though they are wearing protective diving hoods covering their ears.

Still another purpose of this invention is to provide means whereby an underwater electro-acoustical transducer (loudspeaker) is pressure-equalized to make it operable regardless of changes in the hydrostatic pressure of the surrounding water.

Yet another of the objects of this invention is to provide an electro-acoustical transducer of the variable reluctance type for underwater use, having a coefficient of coupling between signal current and force on the diaphragm substantially greater than heretofore obtainable.

In general, our invention makes use of a suitable water and pressure proofed microphone, by which the voice of the underwater diver is converted into electrical impulses and fed into a power amplifier. The amplifier is supplied with power from dry-cell batteries which are housed, along with the amplifier, in a hydrostatic pressure-resistant case. This case also supports a transducer (loudspeaker), which converts the output of the power amplifier into vibrations of the diaphragm whose outer surface is in contact with the surrounding water. The output of the transducer is thus an amplified replica of the diver's voice, or of a continuous tone signal.

The microphone may be mounted against the throat of the diver, or it may be held against the lips or mounted in his diving mask or helmet. A multiple wire cable connects the microphone to the amplifier and also contains a water-proofed switch which the diver uses to turn the device to the "talk" position, or to the "beep" position. In the "beep" position, a continuous high intensity audio tone is produced in the transducer. The switch is normally spring-biased to the "off" position.

The transducer incorporates a pressure equalizing device to make its operation independent of the pressure of the surrounding water.

The nature and advantages of this invention will appear more fully from the following description and the accompanying diagrammatic drawings illustrating the apparatus used. It should be understood, however, that the drawings and description are illustrative only and are not intended to limit the invention except insofar as it is limited by the claims.

In the drawings:

FIGURE 2 is a more detailed view showing the several parts of the communicator;

FIGURE 2A shows a microphone, mounted in a mask;

FIGURE 3 is a view of the case looking at the transducer (loudspeaker) end of the device;

FIGURE 4 is an inside view of the inner half of the transducer, the magnetic structure closest to the near surface of the apparatus being shown in full lines for illustrative purposes;

FIGURE 5 is the diaphragm side view of the inner half of the transducer;

FIGURE 6 is the diaphragm side view of the outer half of the transducer;

FIGURE 7 is a view similar to FIGURE 4 showing the outside view of the outer half of the transducer;

FIGURE 8 is a side view of the outer half of the transducer;

FIGURE 9 is a side view of the inner half of the transducer;

FIGURE 10 is a wiring diagram of the amplifier used in the communicator; and

Figure 1:
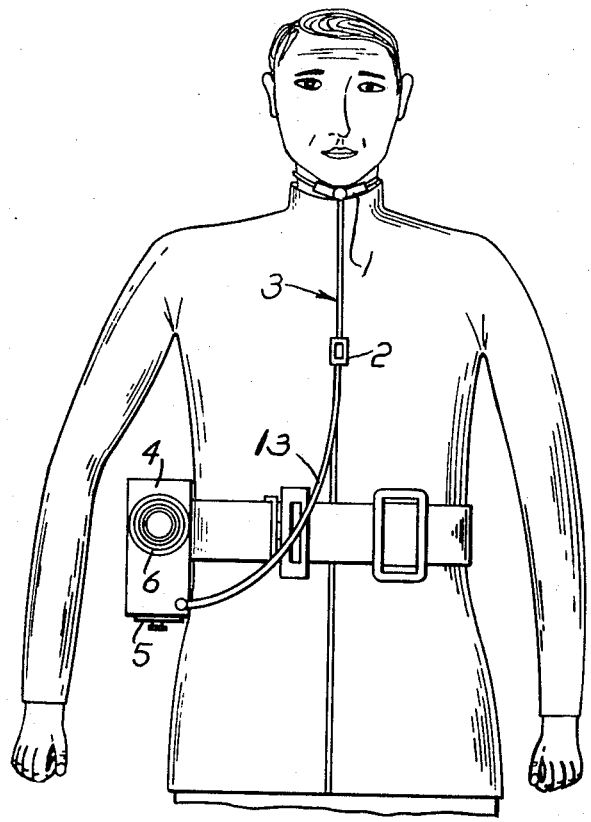
FIGURE 1 is a view of a diver equipped with a communicator embodying our invention.

In the drawing, FIGURE 1 shows a diver equipped with the communicator. In this drawing, the diver is using a throat microphone. It is obvious that any type of microphone which allows the underwater diver to project his voice into the microphone will be just as satisfactory. The choice of microphone is concerned with the type of breathing apparatus the diver is using. In general, the best intelligibility is obtained when the breathing apparatus is of the type which does not require the diver to hold a mouthpiece in his teeth and that provides for a small air space between the diver's mouth and the microphone. Various types of breathing masks and helmets provide this feature. The microphone may then be mounted on the inner side of the mask and substantially in front of the mouth. The throat microphone in FIGURE 1 is indicated by number 1 on the drawing.

An interconnecting cable 3 with a three position (normally spring-biased "off") switch 2, mounted a convenient distance along its length, connects into the amplifier and battery case 4. In FIGURE 1, the diver is wearing the communicator on his weight belt. It can, of course, be mounted in any convenient place, such as on his air tanks. This is particularly true since the audio-acoustical output of the transducer 6 is omni-directional.

Batteries are inserted into the battery case through a hatch 5. An audio frequency power amplifier is mounted in the front part of the same case. Its input is obtained from the microphone, and its output is connected to the transducer 6 which converts the electrical audio frequencies to acoustical audio sounds in the water.

The drawings, FIGURES 2 and 2A, are more detailed representations of the communicator. In these drawings, FIGURE 2 illustrates a throat type of microphone. FIGURE 2A shows a microphone 8 mounted in a mouth mask. In FIGURE 2 a conventional throat microphone 1 is designed to fit around the diver's throat. The two microphone "buttons" 9 and 10 straddle the diver's larynx. The numeral 11 identifies a waterproof cover for the three-position switch 2 which also contains a small microphone transformer 12. The cable 13 leads to the switch 2 and is continued as cable 13 through a gland 14 in the pressure-resistant case 4 and connects to a transistor power amplifier 15. This amplifier is completely encapsulated in a potting compound 16 to render it impervious to the effects of water and water pressure.

The transducer, generally indicated by the numeral 6, is mounted in the front part of the case and held in place by clamp 18. Holes 19 in the case 4 permit water to enter and come into contact with the back of the transducer, so that, in effect, the transducer is totally surrounded by water. It is necessary that the front surface of the diaphragm 20 be in contact with the water in order that its motion be transmitted to the water, to form the audio-acoustic waves in the water. It is also desirable that the rear surface of the diaphragm be kept from contacting the water and setting up another output of acoustic waves which, being displaced by 180° in phase relationship with the waves given off by the front surface of the diaphragm, would tend to cancel them. Hence, the rear surface of the diaphragm is sealed off from the water by a rear body 17 of the transducer and the gasketed spacer ring 21. Since the front surface of the rear body 17 of the transducer is substantially flat, this spacer ring creates a small volume of an air pad, equal to the thickness of the spacer and its gaskets multiplied by the area encircled by the inside diameter of the spacer. A length of flexible waterproof tubing 22, coiled up behind the transducer, is connected into this air pad by means of a capillary tube 23. This tubing and capillary is shown in more detail in FIGURE 4. The free end of the flexible tubing is plugged and sealed by a plug 24. As the diver enters the water, and as the hydrostatic pressure builds up during his descent, the water pressure tends to collapse the flexible tubing, building air pressure in the tubing and in the air pad behind the diaphragm, to equalize the water pressure on the front surface of the diaphragm.

FIGURES 4–9 are detailed drawings of the transducer. Essentially, this transducer utilizes the variable magnetic reluctance principle that is used in almost all telephone receivers. However, in order to secure a greater degree of coupling between signal coil current and the displacement of the diaphragm, and in order to handle the large amount of signal power required, certain original improvements were necessary.

These improvements can best be described by referring to the operating principles of a telephone type receiver. A telephone type, variable reluctance transducer utilizes a series magnetic circuit, consisting of a permanent magnet, a soft iron core for the signal coil, the magnetic diaphragm itself and an air gap between the diaphragm and the iron circuit, which is increased or decreased as the diaphragm is caused to vibrate. The electrical input is current flowing in a signal coil, wound around the soft iron core referred to above, and the acoustical output is obtained by consequent movement of the diaphragm, in response to changes in the magnetic flux caused by changes in current in the signal coil, setting up sound waves in the surrounding medium.

It is well established and accepted that in such a device, the ratio of force $F$ causing the diaphragm to be displaced, to the signal current $i$ causing this force, is equal to the permanent magnetic flux $\phi_1$ times the number of turns $N$ on the signal coil, divided by the reluctance $R_2$ of the alternating current magnetic circuit and the effective area $A$ of the magnetic pole exerting the force on the diaphragm. In mathematical form, this is expressed in the following equation:

$$\frac{F}{i} = \frac{\phi_1 \times N}{R_2 \times A}$$

e.g. see Electro-mechanical Transducers and Wave Filters, by Warren P. Mason—D. Van Nostrand Co., second edition—October 1948 (page 191).

It is apparent that the ratio of force per unit current, $F/i$, may be considered a figure of merit, and the higher this ratio can be made, the more efficiently the transducer will perform. Also, since the number of turns $N$ is fixed by electrical impedance matching considerations, and the pole area $A$ is a function of the physical size of the structure, any improvement in the figure of merit must be obtained by either increasing $\phi_1$, the strength of the permanent magnet, or by making a more efficient magnetic structure insofar as the alternating signal flux is concerned, thereby reducing $R_2$.

Suppose we simply substitute a permanent magnet material having an extremely large coercive force (the ability to retain a high value of $\phi_1$). Unfortunately, all existing known magnetic materials combine such a high coercive force with a high value of A.C. magnetic reluctance $R_2$ and the figure of merit $F/i$, remains substantially the same.

The novel and original improvement in this transducer as shown in FIGURES 4, 5, and 9 is to eliminate the permanent magnet material completely. The magnetic structure 25 is made of laminated, high permeability, audio frequency, magnetic core material, having a very low A.C. magnetic reluctance $R_2$ which means low reluctance in the A.C. signal flux circuit. The signal coil 26 is wound on a leg of this structure. Next, in order to obtain the desired high constant flux $\phi_1$, an additional coil 27 is wound around the leg of the magnetic circuit over the signal coil 26, and a D.C. current is caused to flow through it, see FIGURE 5. This "field" coil 27 sets up a constant flux serving the same purpose as the original permanent magnet flux, but the material in which this flux is produced is a soft-iron type material having a low A.C. magnetic reluctance $R_2$. Symbols S—S designate the leads from the signal coil and F—F leads from the field coil.

The inventors are aware that causing a constant magnetic flux to flow in the low reluctance laminated iron does tend to cause magnetic saturation, and hence increases the A.C. magnetic reluctance $R_2$ over that which it would have in the absence of the contact flux. However, the ratio of $\phi_1$ to $R_2$ (proportional to the figure of merit) is much greater with the field coil than the permanent magnet.

Now that we have increased the constant flux $\phi_1$ by use of a field coil, another factor enters into our considerations. The increased flux $\phi_1$ causes the thin diaphragm to saturate magnetically. This saturation would once more increase the signal current reluctance $R_2$ and lower the figure of merit.

Our novel and original solution to this problem is to place a second magnetic structure as shown in FIGURES 6, 7 and 8, identical to the first, on the opposite side of the diaphragm, with magnetic structure 28 and signal and field coils 29 and 30, and to cause the direction of its constant flux to be in opposition to the constant flux produced by the first unit. The magnetic fluxes of the two units combine only in the diaphragm, and being in opposite directions, cancel out and eliminate diaphragm saturation.

The physical arrangement of the diaphragm 20 in relation to the transducer 6 can best be understood from a study of FIGURES 2, 3, 8 and 9. The inner end of each leg of the magnetic structures 25, 28 are exposed toward the diaphrgam 20 (see FIGURES 5 and 6). The opposite surfaces of these structures might be exposed as shown for illustration in FIGURES 4 and 7 respectively, but are preferably covered as shown in FIGURES 2, 3 and 8 through 9.

The casting of the second or outside magnetic structure is such as to provide full contact of diaphragm 20 with the environmental water across its face. The outside legs of the magnetic structure 28 provide posts (shown at 45 in FIGURE 8) which connect an outside disc 46 and an open inner collar 47. The collar 47 abuts a second spacer ring 21′ located about diaphragm 20 opposite to the previously described spacer ring 21. The return magnetic path about the periphery of the transducer is obtained through the magnetic rings 21, 21′ and diaphragm 20. The exposed base of the center of the magnetic structure 28 is spaced from the diaphragm 20 by a distance equal to the thickness of spacer ring 21′. Access of the water to the outer diaphragm surface is provided between disc 46 and collar 47, being obstructed only slightly by the posts 45.

This second magnetic structure, making a "push-pull" transducer, has the further advantage of doubling the power output of which a single unit would be capable, and of eliminating the need for a center-tapped output transformer otherwise used in conjunction with a push-pull power amplifier. This latter feature can be seen more clearly by references to FIGURE 10 which is a conventional push-pull amplifier, powering the push-pull transducer signal coils, directly, without the use of a center-tapped output transformer.

Also shown in FIGURE 10 is the method by which the transducer field coils 27 and 30 are supplied with current from the battery, whenever the switch 2 is operated away from the "off" position.

In addition, a positive feedback resistor 31 is shown which connects the output circuit back into the input circuit whenever the switch 2 is placed in the "beep" position. This feedback creates a continuous and intense audio frequency in the transducer, which serves as a method of communicating to other divers by code. This is also useful as a danger or warning signal.

To further explain the operation of the amplifier 15, refer to FIGURE 10 as follows: The transistor amplifier circuit consists of a pre-amplifier transistor 32, coupled into the bases of the output power transistors 33 and 34, by means of transformer 35. The power transistors 33 and 34 are connected in a common emitter, push-pull amplifier circuit, using the signal coils 26 and 29 of the transducer for their load impedances.

The battery 36, controlled by switch 2, supplies power to drive the transistors, as well as supplying power for the field coils 27 and 30 of the transducer, and the power for carbon microphone biasing current. Any suitable type of microphone can be used, however.

Resistors 37 and 38 are part of a voltage dividing network to apply proper bias to the base circuits of the power transistors 33 and 34. Bias for the driver transistor emitter-base circuit is obtained from the voltage divider resistors 39, 40 and 41. Resistor 42 is used to limit the microphone biasing current through the microphone input transformer 12 in the cable.

Switch 2 in one position, inserts feedback resistor 31 into the amplifier circuit, to produce a "beeping" signal. In mid position, the switch is open. In the opposite position, it connects the microphone 1 into the circuit. In both "on" positions, the switch energizes the transistor amplifier circuit.

When the underwater diver communicates to persons in a boat on the surface of the water with this device, such surface boat will make use of an underwater hydrophone (water and pressure-proofed microphone) in order to receive the acoustical waves in the water, which the diver has made.

When divers are operating in cold water, it is customary for such divers to wear a flexible, close-fitting hood 43 (FIGURE 11) of thermally insulated material, so that the heat of the diver's body may be retained and his skin temperature kept higher than would otherwise be the case. This hood normally reduces the ability of a diver to hear underwater sounds, by acting as a sound absorbing film between the underwater sound waves and the diver's natural acoustical receiving areas.

Figure 11:
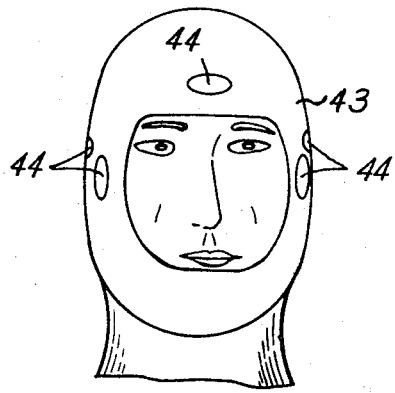
FIGURE 11 is a view of a diver wearing a hood equipped with pieces of sound conducting rubber.

In the underwater communicator described herein, the inventors make use of small discs 44 or other shaped areas, inserted in the diving hood 43 in place of part of the hood material, which have substantially the same acoustical transmitting properties as the water itself. A well known material used for this purpose is a rubber known as "Rho-C." Discs of this material, the same thickness as the hood material, inserted and cemented in place opposite each ear, offer protection against the cold water, and at the same time substantially improve the diver's ability to hear underwater sounds with the hood on. In some cases, it has also proved useful to insert pieces of this sound-conducting rubber in the hood adjacent to the bone in the base of the diver's skull, or adjacent to his forehead or cheekbones, when he hears largely by bone conduction. FIGURE 11 is a drawing of a diver wearing a hood equipped with pieces 44 of sound conducting rubber inserted opposite the ears, the forehead, and the cheekbones.

The above described underwater communicator has proved to be useful to diving instructors giving underwater instruction to diving students. In addition, when commercial or salvage divers make use of this communicator, the safety and efficiency of their work is much enhanced. Sports divers ordinarily dive in pairs, in what is known as the "buddy system." Their safety is greatly increased if one or more of the divers are equipped with the underwater communicator.

We claim:
1. In a device for underwater communication, including:
   an electrical power source;
   an amplifier operatively connected to the power source;
   and a diaphragm of magnetic material having one surface in water contact when in use;
   the improvement in a transducer coupled with the diaphragm comprising:
      a first magnetic core spaced outwardly adjacent to one surface of said diaphragm;
      a first signal coil operatively connected to said amplifier, said signal coil being wound about said magnetic core;
      a first field coil wound about said core;
      a second magnetic core identical to said first magnetic core and located in opposition thereto outwardly adjacent the remaining surface of said diaphragm;
      a second signal coil operatively connected to said amplifier, said second signal coil being wound about said second magnetic core;
      a second field coil wound about said second magnetic core;
      and selectively operable switch means connected to said first and second field coil and to said power source to complete an electrically conductive circuit between said field coil and said power source.

2. The apparatus as set out in claim 1 wherein each of said cores includes:
   a first leg terminating at a location outwardly adjacent to the center of the diaphragm;
   and a second integral leg completing a return magnetic path at the periphery of the diaphragm.

3. The apparatus as set out in claim 1 wherein each core constructed of high permeability magnetic material.

4. The apparatus as set out in claim 1 wherein said amplifier is a push-pull amplifier having the power output connections thereof operatively connected to said first and second signal coils respectively.

5. The apparatus as set out in claim 1 wherein said amplifier includes constant signal producing means; and means selectively operable to cause said constant signal producing means to be operably connected to said signal coils.

6. The apparatus as set out in claim 1 further comprising a signal pickup means selectively connected to said amplifier.

7. The apparatus as set out in claim 1 in combination with a diver's hood having insertions of a material having substantially the same acoustics transmitting properties as water.

8. A transducer for underwater communication comprising:
   a diaphragm of magnetic material having one surface in water contact when in use;
   and a pair of opposed magnetic structures of identical design, located outwardly adjacent the respective surfaces of said diaphragm, each magnetic structure comprising:
   a core having one end terminating adjacent the diaphragm, but spaced therefrom;
   a signal coil wound about said core;
   and a field coil superimposed on said core.

9. The apparatus as set out in claim 8 wherein each of said cores includes:
   a first leg terminating at a location outwardly adjacent to the center of the diaphragm;
   and a second integral leg completing a return magnetic path at the periphery of the diaphragm.

10. The apparatus as set out in claim 8 wherein each core is constructed of high permeability magnetic material.

References Cited
UNITED STATES PATENTS

| | | | |
|---|---|---|---|
| 1,726,200 | 8/1929 | Thomas. | |
| 2,429,104 | 10/1947 | Olson | 340—13 |
| 3,174,129 | 3/1965 | Laughlin et al. | 340—5 |
| 3,231,853 | 1/1966 | Freis | 340—8 |
| 3,235,835 | 2/1966 | Giudice | 340—5 |
| 3,281,772 | 10/1966 | Abbott | 340—14 |

RICHARD A. FARLEY, *Primary Examiner.*